United States Patent
Hansson (10) Patent No.: US 6,819,946 B2
(45) Date of Patent: Nov. 16, 2004

(54) APPARATUS AND METHOD FOR CONTROLLING SOURCE OF SOUND EMITTED FROM A MOBILE TERMINAL

(75) Inventor: Magnus F. Hansson, Lund (SE)

(73) Assignee: Sony Ericsson Mobile Communications AB (SE)

( * ) Notice: Subject to any disclaimer, the term of this patent is extended or adjusted under 35 U.S.C. 154(b) by 280 days.

(21) Appl. No.: 10/065,330

(22) Filed: Oct. 4, 2002

(65) Prior Publication Data

US 2004/0203996 A1 Oct. 14, 2004

(51) Int. Cl.$^7$ .............................. H04B 1/38
(52) U.S. Cl. .................. 455/569.1; 379/433.02
(58) Field of Search .................. 455/569.1, 567, 455/575.1; 379/388.01, 388.02, 420.01, 420.02, 420.03, 420.04, 422, 433.02, 433.06, 433.12, 444

(56) References Cited

U.S. PATENT DOCUMENTS

| | | |
|---|---|---|
| 5,790,679 A | 8/1998 | Hawker et al. |
| 6,002,949 A * | 12/1999 | Hawker et al. .......... 455/569.1 |
| 6,349,225 B1 | 2/2002 | Lands et al. |

* cited by examiner

Primary Examiner—Nick Corsaro
Assistant Examiner—Tu Nguyen
(74) Attorney, Agent, or Firm—Moore & Van Allen PLLC; Michael G. Johnston (57) ABSTRACT

An apparatus is provided for controlling the source of sound emitted from a mobile terminal used in a wireless communication system. The apparatus comprises a housing defining first and second acoustic ports communicating with the exterior of the mobile terminal. A switch is disposed in the housing for movement between a first position where the switch covers the first port to substantially prevent sound produced by a speaker from passing to the exterior of the mobile terminal while allowing sound to pass from the second port. In the second position, the switch covers the second port to substantially prevent sound from passing through the second port to the exterior of the mobile terminal while allowing sound to pass from the first port. A controller distinguishes among the different operating modes of the mobile terminal and is operable to access a plurality of audio settings representative of the sound level to be emitted which is associated each operating mode. A motive device in communication with the controller moves the switch between the first position to the second position for changing the source of sound from the mobile terminal depending on the operating mode.

24 Claims, 4 Drawing Sheets

APPARATUS AND METHOD FOR
CONTROLLING SOURCE OF SOUND
EMITTED FROM A MOBILE TERMINAL

BACKGROUND OF INVENTION

This invention relates generally to a communication device such as a mobile terminal, and more particularly to a mobile terminal used in a wireless communications system wherein the mobile terminal produces variable audio signals based on the operating mode of the mobile terminal.

A mobile terminal is used for placing and receiving calls in a wireless communications system, such as a mobile telephone in a cellular telephone system. The mobile terminal generates audio signals based on transmissions received. For example, upon receiving an incoming call, the mobile terminal generates a loud audio signal to notify the user of the call.

It is necessary to control the acoustic level of the audio signal emitted by mobile terminals according to a plurality of different functions, or operating modes, of the mobile terminal in order to provide an acoustic level that is appropriate for the current operating mode. Generally, there are two operating modes related to the level of sound emitted from a mobile terminal: receiver mode and call alert mode. A mobile terminal operates in receiver mode when a user is on a call and holding the mobile terminal close to an ear. This is sometimes referred to as the handset mode. When the user is not on a call, the mobile terminal automatically operates in the call alert mode and is prepared to give a loud audio signal to indicate an incoming call. Some mobile terminals also operate in a loudspeaking mode wherein the mobile terminal is away from the ear and functioning as a speaker phone. This is sometimes referred to as the hands-free mode.

Most mobile terminals include separate components to generate different levels of sound according to the operating mode. For example, a mobile terminal may include a miniature receiver capsule for receiver mode and a speaker element or buzzer component for call alert mode, which operate independently. Operation in the loudspeaking mode, when available, is usually accomplished using yet another speaker element. However, using separate components to generate audio signals for each of the operating modes of a mobile terminal increases the size and cost of the mobile terminal.

One solution for reducing the size and cost of mobile terminals is to provide a single speaker element, such as a transducer, which is controlled to emit sound appropriate for each of the operating modes of the mobile terminal. A potential problem with this configuration is the possibility that the mobile terminal will be in one of the operating modes at the wrong time. This is a problem because of the difference in the level of sound emitted by the mobile terminal for each of the operating modes. For example, a user does not want the loud alert mode sound output when the mobile terminal is being held close to the ear. Unfortunately, when an incoming call is received by a mobile terminal, the user must typically perform some action to answer the call. Some mobile terminals include a key on a keypad or a pushbutton that must be depressed to answer the call. If the user fails to press the appropriate button on the mobile terminal, or presses the wrong button, and holds the mobile terminal to the ear, the next alert level audio signal is uncomfortable to the user. This could also happen if the mobile terminal is in the loudspeaking mode by mistake.

To overcome this deficiency, the earpiece of some mobile terminals are provided with an optical proximity sensor that senses when the mobile terminal is near an object, such as someone's ear, and lowers the level of the sound. This is an expensive solution. Moreover, this function also complicates the use of the call alert mode because the mobile terminal might be in the user's pocket, or otherwise stored, and would not generate a loud alert level-audio signal when necessary. Other phones include a manual slide which, in one position, closes the acoustic ports in the earpiece. Openings along the sides of the mobile terminal are provided as a source of loud audio signals. The drawback to this design is the user will experience ambient noise entering through the side openings when the mobile terminal is in the receiver mode. This can make hearing difficult if the user is in a noisy environment.

For the foregoing reasons, there is a need for control of the source of sound emitted from a mobile terminal so as to minimize the possibility that the sound levels are inappropriate for a particular source and operating mode of the mobile terminal. The new mobile terminal should be inexpensive to manufacture and simple to use. Moreover, the mobile terminal should minimize the effect of ambient noise when operating in the receiver mode in a noisy environment.

SUMMARY OF INVENTION

According to the present invention, an apparatus is provided for controlling the source of sound emitted from a mobile terminal used in a wireless communication system. The apparatus comprises a housing defining first and second acoustic ports communicating with the exterior of the mobile terminal. A speaker for producing sound is disposed within the housing in a position to direct the sound through the ports. A switch is also disposed in the housing for movement between a first position and a second position. In the first position, the switch covers the first port to substantially prevent sound produced by the speaker from passing through the first port to the exterior of the mobile terminal while allowing sound to pass from the second port. In the second position, the switch covers the second to substantially prevent sound produced by the speaker from passing through the second port to the exterior of the mobile terminal while allowing sound to pass from the first port. A controller distinguishes between a plurality of different operating modes of the mobile terminal. The controller is operable to access a plurality of audio settings representative of the sound level to be emitted from the speaker, each operating mode of the mobile terminal being associated with one of the audio settings for controlling the level of sound emitted from the speaker depending on the operating mode. Means in communication with the controller are provided for moving the switch from the first position to the second position for changing the source of sound from the mobile terminal depending on the operating mode. An audio block is in communication with the controller for receiving a signal from the controller for adjusting the audio setting of the speaker depending on the operating mode of the mobile terminal. A user input operatively associated with the controller communicates a change of operating mode to the controller.

Also according to the present invention, a mobile terminal is provided comprising a frame having at least one acoustic port defined in the ear piece of the phone and a second acoustic port outside of the ear piece area. A speaker for producing sound is disposed within the frame in a position to direct the sound through the ports. A switch is moveably disposed in the frame. In a first position, the switch covers the first port for substantially preventing sound produced by the speaker from passing through the first port while allowing sound to pass from the second port. In a second position, the switch covers the second port to substantially prevent sound from passing through the second port while allowing sound to pass from the first port. A controller distinguishes among a plurality of different operating modes of the phone. The controller is operable to access a plurality of audio settings representative of the sound level to be emitted from the speaker based on the operating mode of the phone. Means in communication with the controller is provided for moving the switch from the first position to the second position for changing the source of sound from the phone. An audio block in also communication with the controller for receiving a signal from the controller wherein the audio block adjusts the audio setting of the speaker depending on the operating mode of the phone. A user input operatively associated with the controller communicates a change of operating mode to the controller.

Further according to the present invention, a method is provided for controlling the source of sound emitted from a mobile terminal including a housing defining first and second acoustic ports, a speaker disposed in the housing to direct sound through the ports, a switch moveably disposed in the housing between a first position and a second position, and a controller for distinguishing between a plurality of different operating modes of the mobile terminal. The method comprises the steps of detecting a change in the operating mode of the mobile terminal and moving the switch to the appropriate position based on the operating mode of the mobile terminal, where the switch is adapted to cover one of the ports to substantially prevent sound from passing through the port to the exterior of the mobile terminal while allowing sound to pass from the other port.

Still further according to the present invention, a system is provided for controlling the source of sound emitted from a mobile terminal including a housing defining first and second acoustic ports, a speaker disposed within the housing to direct the sound through the ports, and a controller distinguishing between a plurality of different operating modes of the mobile terminal. The system comprises a switch disposed in the housing for movement between a first position and a second position. The switch is adapted in the first position to cover the first port to substantially prevent sound produced by the speaker from passing through the first port to the exterior of the mobile terminal while allowing sound to pass from the second port, and in the second position to cover the second port to substantially prevent sound from passing through the second port while allowing sound to pass from the first port. Means are provided for detecting a change in the operating mode of the mobile terminal, and means for moving the switch to the appropriate position based on the current operating mode of the mobile terminal.

BRIEF DESCRIPTION OF DRAWINGS

For a more complete understanding of the present invention, reference should now be had to the embodiments shown in the accompanying drawings and described below. In the drawings.

DETAILED DESCRIPTION

Certain terminology is used herein for convenience only and is not to be taken as a limitation on the invention. For example, words such as "upper," "lower," "left," "right," "horizontal," "vertical," "upward," and "downward" merely describe the configuration shown in the FIGs. Indeed, the components may be oriented in any direction and the terminology, therefore, should be understood as encompassing such variations unless specified otherwise.

Referring now to the drawings, wherein like reference numerals designate corresponding or similar elements throughout the several views, a mobile terminal according to the present invention is shown and generally designated at 20. The mobile terminal 20 is adapted for communication in a wireless communication network. In the embodiment shown in FIG. 1, the mobile terminal 20 is a cellular telephone, which may be conventional except as otherwise provided in this description.

Figure 1:
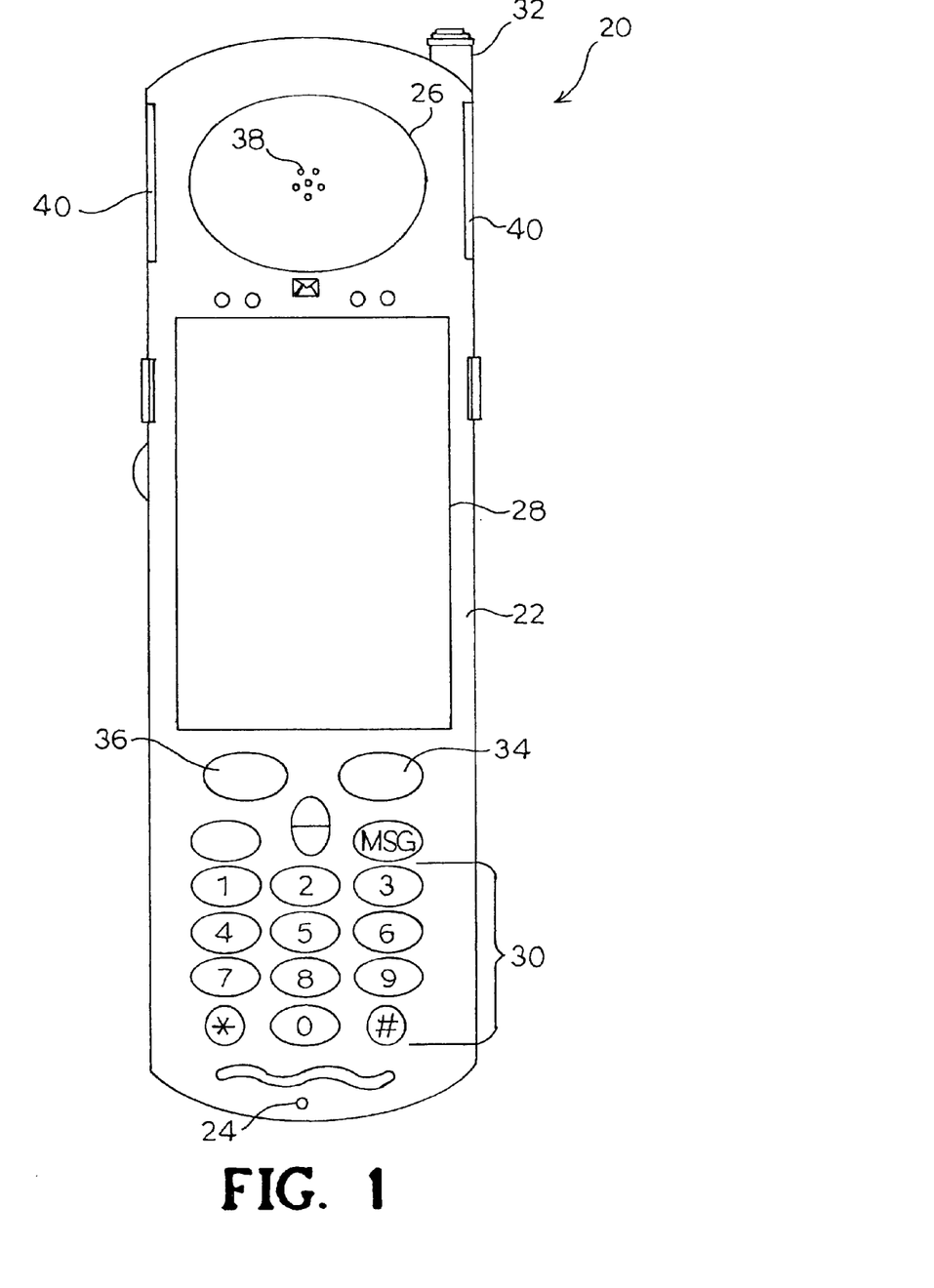
FIG. 1 is an elevation view of a mobile terminal according to the present invention.

The mobile terminal 20 comprises a case or housing 22, which may be of any desired size and shape. The housing 22 includes a mouthpiece 24 for inputting sound, an earpiece 26 for receiving sound, a display 28, and a key pad 30 with standard alphanumeric keys such as are found on many conventional mobile terminals. An extendible antenna 32 transmits and receives data over the wireless communication network. Various other controls may also be provided on the mobile terminal 20, some of which are used with features according to the present invention to be described below. In particular, the keypad 30 includes a Send button 34 and an End button 36.

The earpiece 26 defines several openings 38 or acoustic ports for outputting sound. Ports 40 are also provided in the sides of the terminal housing 22. The side ports 40 can be adjacent to, or at the junction of, a pair of clamshell molded parts forming the housing 22. One or more ports (not shown) may also extend through the rear wall of the housing 22. As will be described below, the earpiece ports 38 are the source of audio signals or sound from the mobile terminal 20 when the terminal is in the receiver mode. The side ports 40 are the source of audio signals or sound when the mobile terminal 20 is in the call alert or loudspeaking mode.

According to another embodiment of the present invention, the mobile terminal 20 may include a cover (not shown), also referred to as a flip or flip cover, pivotally mounted to the housing 22 by a hinge. The cover is moveable between an open position. In the open position, the display 28 and keypad 30 are visible and accessible to a user. In the closed position, the display 28 and keypad 30 are substantially covered by the cover. A sensor within the housing 22 senses the position of the cover. The sensor enables the mobile terminal 20 to answer individual calls upon opening the terminal cover, as is known in the art. Because there are many types of mobile terminal housings 22 and associated components that are well known in the art and that may be utilized to practice the present invention, a more detailed description of these components is not required. It is understood that the present invention is not directed to any particular style of housing.

Moreover, while the present invention is described herein in the context of a mobile terminal 20 in the form of a cellular telephone, it should be understood that the mobile terminal of the present invention is not so limited and may find utility in other applications. For example, the term mobile terminal as used here may include a Personal Communications System (PCS) terminal that may combine a cellular telephone with data processing, facsimile and data communications capabilities; a Personal Digital Assistant (PDA) that can include a radiotelephone, pager, Internet/intranet access, Web browser, organizer, calendar and/or a global positioning system (GPS) receiver; and a conventional laptop and/or palmtop receiver or other computer system that includes a receiver for generating different levels of sound. Mobile terminals may also be referred to as pervasive computing devices. In one embodiment of the present invention, the invention may be implemented on a computer system having a memory circuit for storage of data, a receiver which acts to generate different levels of sound, and a control circuit that is configured to control the flow of data between the memory and receiver.

Figure 2:
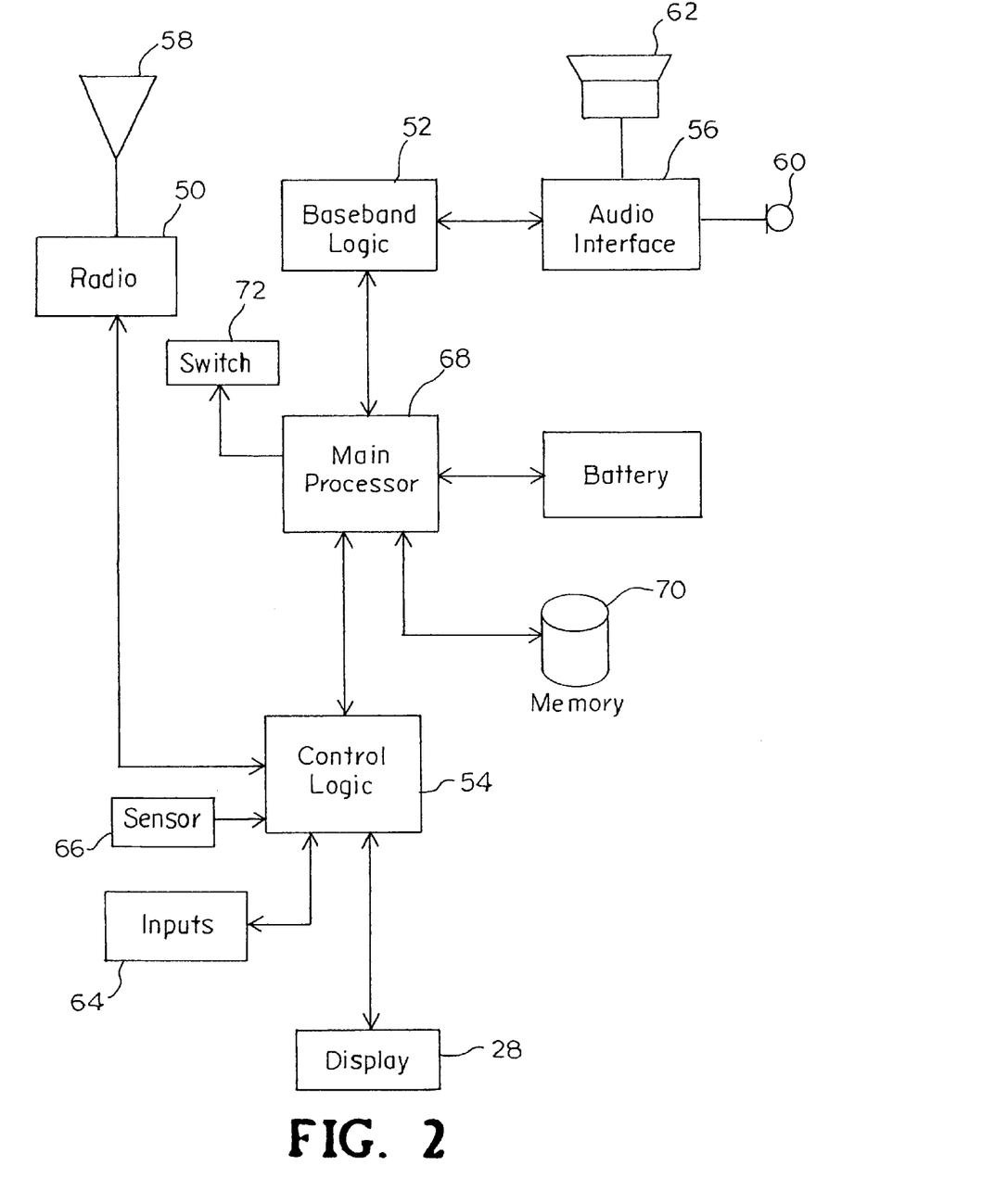
FIG. 2 is a block diagram of the mobile terminal of FIG. 1.

Referring now to FIG. 2, a block diagram of a mobile terminal implementing the present invention is shown. The mobile terminal includes a radio block 50, a baseband logic block 52, a control logic block 54, and an audio interface block 56. Within the radio block 50, the receive and transmit information is converted from and to the radio frequencies (RF) of the various carrier types, and filtering using baseband or intermediate frequency circuitry is applied; as is understood in the art. Connected to the radio block 50 is the terminal's antenna system 58 for sending and receiving radio signals between itself and the wireless communication network. In the baseband logic block 52, basic signal processing occurs, e.g., synchronization, channel coding, decoding and burst formatting, as is understood in the art.

The audio interface block 56 handles voice as well as analog-to-digital (A/D) and D/A processing. The audio interface block 56 also receives input through a microphone 60 and produces output through a speaker 62. The speaker 62 can be any of a number of electroacoustic transducer types. According to the present invention, the audio interface block 56 comprises an electronic audio gain circuit for adjusting the audio characteristics of the speaker. In one embodiment, the audio gain circuit includes an audio gain controller which controls a speaker amplifier which amplifies a received audio signal. (Note that amplification as used herein may be either positive or negative.) The audio gain circuit is preferably in the form of programmable gain control circuitry, but may comprise a wide variety of circuits known in the art. Accordingly, a more detailed description of the electronic audio gain circuit is not required.

The control logic block 54 controls and coordinates the functions of the aforementioned blocks and also plays an important role in controlling the human interface components such as display 28, inputs 64 (representing, for example, Send button 34 and End button 36), and cover position sensor 66. The control logic block may include processing circuitry such as general-purpose microprocessors, digital signal processors (DSPs), application specific integrated circuits (ASICs), various types of signal conditioning circuitry, including analog-to-digital converters, digital-to-analog converters, input/output buffers, etc., such as a main processor 68, shown for illustrative purposes.

The present invention includes steps which, in various embodiments, may be carried out by elements of the main processor 68 executing sequences of instructions. The instructions may be stored in memory 70 as program code, often in the form of microcode, and data that enables the operation of the mobile terminal 20 through the processor or processors so that the mobile terminal can operate within the wireless communication network. The memory 70 may include one or more physical memory devices, which may include volatile storage devices, non-volatile storage devices, or both. For example, the memory 70 may include both random access memory (RAM), read-only memory (ROM), various forms of programmable and/or erasable (ROM) (e.g., PROM, EPOM, EEPROM, etc.), flash memory, or any combination of such devices. Software instructions or data may be loaded into the mobile terminal 20 from another device, such as a remote computer system, over a wireless connection.

The main processor 68 and memory 70 control the overall operation of the mobile terminal 20 and are together referred to herein as a controller, which may be embodied in the control logic block 54, main processor 68, memory, or any combination thereof. The controller is operable to control the operating mode of the mobile terminal in response to unsolicited, over-the-air, push messages received through the radio block 50. In one embodiment of the present invention, the memory 70 stores predetermined settings for the audio characteristics of the speaker 62 based on the operating mode of the mobile terminal 20, although any recall method known in the art may be used such as a look-up table or hardware settings. Code signals received at the radio block 50 via the antenna 58 are processed by the mobile terminal's 20 logic circuits and an audio signal is routed to the audio interface block 56. Based on the predetermined settings in memory 70, the audio gain circuit signals the speaker amplifier to amplify the received audio signal by a predetermined level under instructions from the controller and sends the audio signal to the speaker 62. According to the present invention, the capability of the controller to receive a signal and control the positioning of a mechanical element (described below) as a function of the signal also resides in memory 70.

To facilitate the description, it is henceforth assumed that aspects of the present invention are generally carried out through the execution of software instructions in the mobile terminal 20. It is envisioned that these instructions may be written in the Java language, or alternatively in C or C++. Note, however, that other languages may be substituted within the scope of the present invention. As is well-known, Java is an application designed specifically for network-connectable applications on consumer devices. The details of developing software in Java is well-known to those skilled in the relevant art and are not required for an understanding of the present invention. Accordingly, such details are not provided herein.

Certain embodiments of the present invention may be carried out by hard-wired circuitry rather than by executing software, or by a combination of hard-wired circuitry with software. Hence, it will be recognized that the present invention is not limited to any specific combination of hardware circuitry and software, nor to any particular source for software instructions. For example, the control logic block 54 and main processor 68 may be combined in one device as is known in the art.

Figure 3:
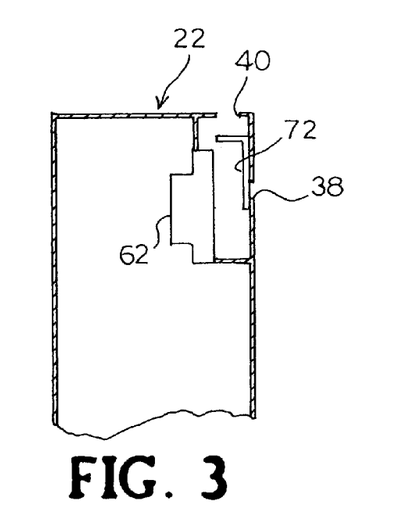
FIG. 3 is a schematic view showing a speaker housing including a moveable switch for covering acoustic ports in the housing.
Figure 4:
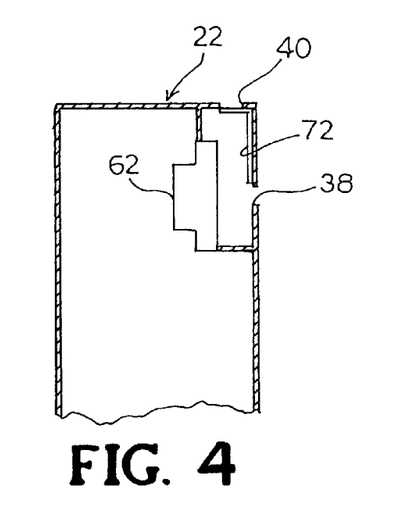
FIG. 4 is a schematic view showing the speaker housing of FIG. 3 with the switch in a second position.

As schematically shown in FIG. 3, the speaker 62 is disposed in the housing 22 adjacent the acoustic ports 38, 40 which serve as the source of sound from the mobile terminal 20. A switch 72 is movably disposed in the housing 22 between the speaker 62 and the acoustic ports 38, 40. The switch 72 is movable between a loudspeaking or call alert mode position and a receiver mode position. In the loudspeaking or call alert mode position, shown in FIG. 3, the switch 72 covers the acoustic port 38 defined in the ear piece 26. Thus, sound generated at the speaker is emitted only from the side port 40. When the switch 72 is in this position, the sound level generated by the mobile terminal 20 is high, according to the predetermined settings stored in memory 70. In the receiver mode position, shown in FIG. 4, the switch 72 covers the side port 40 allowing sound from the speaker 62 to be emitted only from the earpiece port 38. With the switch 72 in the receiver mode position, the sound level emitted from the mobile terminal 20 is low. Since the switch 72 is covering the side port 40, there is no open acoustic path from the user's ear to surrounding air which makes it possible to seal the ear piece 26 to the ear and shut out ambient noise. The movement of the switch 72 between the first and second position is mechanically actuated and may be accomplished using a linear motor, a radial step motor or other device for transforming an electrical signal into motion of a mechanical element.

Figure 5:
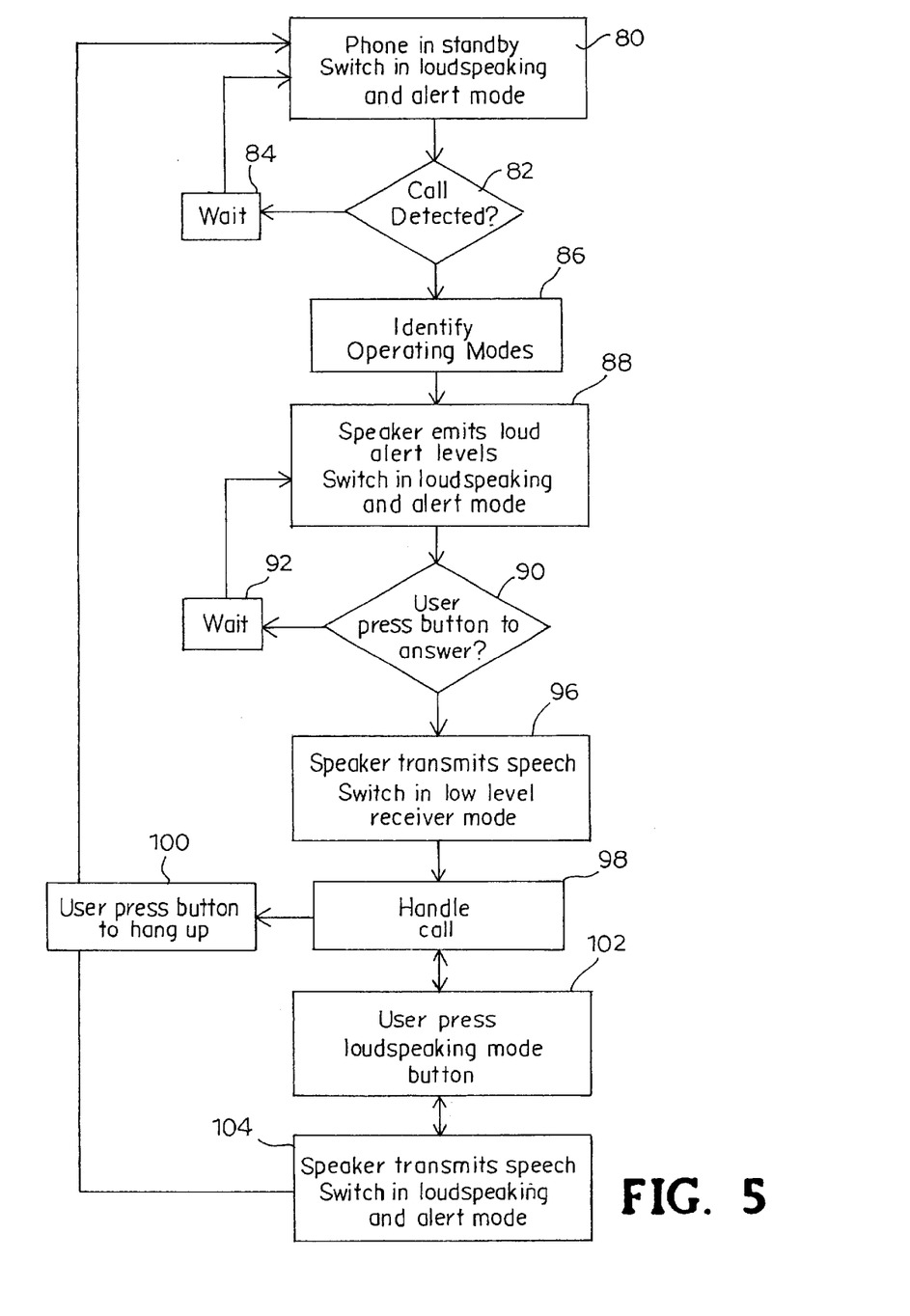
FIG. 5 is a flow diagram illustrating operation of a control program implemented in the controller shown in FIG. 2 to control the source of sound emitted from the mobile terminal.

FIG. 5 is a flow diagram illustrating a control program implemented in the controller so that the mobile terminal 20 emits sound from the appropriate acoustic ports based on the operating mode of the mobile terminal 20. It is understood that the flow diagram of FIG. 5 operates in conjunction with other control programs that control various other functions of the mobile terminal 20.

The routine begins at a block 80 where the mobile terminal 20 is in standby and the switch is in the call alert and loudspeaking position with the side port 40 open and the earpiece port 38 sealed. The routine proceeds to a decision block 82 which determines if a call is detected. If not, then the control program waits momentarily at a block 84 and then loops back to the decision block 82. During the wait block 84, other processing functions can be performed as is conventional.

Once a call is detected at the decision block 82, the controller identifies the operating mode of the mobile terminal 20 at block 86 and communicates this identification to the audio gain circuit in the audio interface block 56. The audio gain circuit, and more particularly, the audio gain controller, then selects the proper gain settings for the speaker amplifier from the predetermined settings stored in memory 70 based on the identified mode. Since the mobile terminal 20 is in the loudspeaking and call alert mode, the controller controls the speaker 62 to emit loud alert level sound at block 88.

The program proceeds to a decision block 90 which determines if the call is answered. This is accomplished, as is known in the art, by the user pressing a button, such as the Send button 34, or opening the terminal cover, or using voice control if available. If not, then the control program waits momentarily at a block 92 and then loops back to the decision block 90.

In response to answering an incoming call at block 94, the control program signals means for moving the switch 72 to cover the side port 40 and open the earpiece port 38 at block 96. The controller changes the operating mode of the mobile terminal 20 to the receiver mode and communicates this change to the audio gain circuit in the audio interface block 56. The audio gain controller selects the proper settings for the speaker amplifier from the predetermined settings stored in memory 70 based on the identified mode. Amplification is reduced so that the speaker 62 transmits speech at a low sound output level appropriate for the receiver mode. Thereafter, control proceeds to a block 98 which handles the call in a conventional manner with sound emitted from the earpiece port 38 into the ear of the user.

At this point, the user can end the call by pressing the End button at a block 100, or by closing the terminal cover. The control program of the mobile terminal 20 returns to block 80 where the switch 72 is moved to cover the ear piece port 38 and open the side port 40 while the controller changes the operating mode of the mobile terminal 20 to the call alert and loudspeaking mode to await another incoming call.

Alternatively, if the user desires the mobile terminal 20 to function in the loudspeaking mode, the user actively provides input effecting the change, such as by pressing a loudspeaking button at a block 102. The control program signals the switch moving means to move the switch 72 to cover the earpiece port 38 and the open the side port 40. The controller changes the operating mode of the mobile terminal 20 to the call alert and loudspeaking mode at block 104 and communicates this change to the audio interface block 56 so which directs the speaker 62 to transmit speech in the high sound output level from the side port 40. The mobile terminal 20 can then be used as a handsfree speaker phone. Pressing the loudspeaker button again, or another button, at block 102 returns the mobile terminal 20 to receiver mode operation at the block 98. The user can also press the End button at the block 100, or close the terminal cover, to end the call and return the control program of the mobile terminal 20 to block 80 to await another incoming call, as described above. It is understood that the decision tree shown in FIG. 5 is exemplary. Accordingly, the present invention is not limited to any particular decision tree.

The control program according to the present invention operates to ensure that the sound level emitted from the acoustic ports 38, 40 of the mobile terminal 20 is appropriate for the current operating mode of the phone. When the mobile terminal 20 is in the call alert or loudspeaking mode, all of the sound comes out of the side port 40 and not out of the earpiece port 38. This prevents the user from getting loud sound levels directly into the ear even when the user mistakenly puts the mobile terminal up to the ear in the call alert or loudspeaking mode.

Although the present invention has been shown and described in considerable detail with respect to a particular exemplary embodiments thereof, it should be understood by those skilled in the art that I do not intend to limit the invention to the embodiments since various modifications, omissions and additions may be made to the disclosed embodiments without materially departing from the novel teachings and advantages of the invention, particularly in light of the foregoing teachings. For example, the mobile terminal may have a dedicated component for generating sound in each of the operating modes of the mobile terminal. Accordingly, I intend to cover all such modifications, omission, additions and equivalents as may be included within the spirit and scope of the invention as defined by the following claims. In the claims, means-plus-function clauses are intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a crew may be equivalent structures.

What is claimed is:

1. An apparatus for controlling the source of sound emitted from a mobile terminal used in a wireless communication system, the mobile terminal including a housing defining first and second acoustic ports communicating with the exterior of the mobile terminal, a speaker for producing sound disposed within the housing in a position to direct the sound through the ports, a controller distinguishing between a plurality of different operating modes of the mobile terminal, the controller operable to access a plurality of audio settings representative of the sound level to be emitted from the speaker based on the operating mode, the apparatus comprising:

a switch adapted to be disposed in the housing for movement between a first position and a second position, the switch adapted in the first position to cover the first port to substantially prevent sound produced by the speaker from passing through the first port to the exterior of the mobile terminal while allowing sound to pass from the second port, and in the second position to cover the second port to substantially prevent sound produced by the speaker from passing through the second port to the exterior of the mobile terminal while allowing sound to pass from the first port;

a user input operatively associated with the controller for communicating a change of operating mode to the controller; and means in communication with the controller for moving the switch between the first position to the second position in response to the change in the operating mode, wherein the source of sound emitted from the mobile terminal is changed based on the operating mode of the mobile terminal.

2. The apparatus for controlling the source of sound emitted from a mobile terminal as recited in claim 1, wherein the switch moving means is a device for transforming an electrical signal into motion of a mechanical element operatively connected to the device.

3. The apparatus for controlling the source of sound emitted from a mobile terminal as recited in claim 1, wherein the switch moving means is a linear motor or a radial step motor.

4. A mobile terminal for use in a wireless communication system, comprising:

a frame defining at least one acoustic port communicating with the exterior of the mobile terminal in an area where the ear of the user is to be positioned and a second acoustic port communicating with the exterior of the mobile terminal outside of the area;

a speaker for producing sound within the frame in a position to direct the sound through the ports;

a switch disposed on the frame for movement between a first position and a second position, the switch in the first position covering the at least one acoustic port to substantially prevent sound produced by the speaker from passing through the at least one port to the exterior of the mobile terminal while allowing sound to pass from the second port, and in the second position to cover the second acoustic port to substantially prevent sound produced by the speaker from passing through the second port to the exterior of the mobile terminal while allowing sound to pass from the at least one port;

a controller for distinguishing between a plurality of different operating modes of the mobile terminal, the controller operable to access a plurality of audio settings representative of the sound level to be emitted from the speaker, each operating mode of the phone being associated with one of the audio settings for controlling the level of sound emitted from the speaker depending on the operating mode;

an audio block in communication with the controller for receiving a signal from the controller wherein the audio block adjusts the audio setting of the speaker depending on the operating mode of the phone;

means for moving the switch between the first position and the second position in communication with the controller for changing the source of sound from the phone depending on the operating mode; and a user input operatively associated with the controller for communicating a change of operating mode to the controller, wherein the source of sound emitted from the phone is based on the operating mode of the mobile terminal.

5. A mobile terminal as recited in claim 4, wherein the mobile terminal is a cellular telephone.

6. A mobile terminal as recited in claim 4, wherein the frame comprises a front face, a rear face and respective side walls extending between and interconnecting the front face and the rear face, and wherein the second acoustic port is defined in one of the side walls of the frame.

7. A mobile terminal as recited in claim 4, wherein the controller comprises a memory having stored therein the audio settings representative of the sound level to be emitted from the speaker.

8. A mobile terminal as recited in claim 4, wherein the audio block comprises an audio circuit including an audio gain controller and a speaker amplifier for amplifying a received audio signal.

9. A mobile terminal as recited in claim 4, wherein the switch moving means is a device for transforming an electrical signal into motion of a mechanical element operatively connected to the device.

10. A mobile terminal as recited in claim 4, wherein the switch moving means is a linear motor or a radial step motor.

11. A mobile terminal as recited in claim 4, wherein the user input comprises an actuating button.

12. A mobile terminal as recited in claim 4, wherein the user input comprises a cover moveably mounted on the housing for movement between a first position and a second position, and a sensor for sensing when the cover is in the second position.

13. A method for controlling the source of sound emitted from a mobile terminal used in a wireless communication system, the mobile terminal including a housing defining first and second acoustic ports communicating with the exterior of the mobile terminal, a speaker for producing sound disposed within the housing in a position to direct the sound through the ports, a switch moveably disposed in the housing between a first position and a second position, and a controller for distinguishing between a plurality of different operating modes of the mobile terminal, the method comprising the steps of:

detecting a change in the operating mode of the mobile terminal; and moving the switch to the appropriate position based on the current operating mode of the mobile terminal, where the switch is adapted to cover one of the ports to substantially prevent sound produced by the speaker from passing through the port to the exterior of the mobile terminal while allowing sound to pass from the other port.

14. The method for controlling the source of sound emitted from a mobile terminal as recited in claim 13, further comprising the step of accessing a plurality of audio settings representative of the sound level to be emitted from the speaker, each operating mode of the mobile terminal being associated with one of the audio settings for controlling the level of sound emitted from the speaker depending on the operating mode.

15. The method for controlling the source of sound emitted from a mobile terminal as recited in claim 13, further comprising the steps of:
- changing the operating mode of the mobile terminal;
- identifying the current operating mode of the mobile terminal; and
- adjusting the audio characteristics of the speaker based on the current operating mode of the mobile terminal to emit the appropriate sound level for the operating mode.

16. The method for controlling the source of sound emitted from a mobile terminal as recited in claim 15, wherein changing the operating mode of the mobile terminal comprises answering an incoming call to the mobile terminal.

17. A system for controlling the source of sound emitted from a mobile terminal, the mobile terminal comprising a housing defining first and second acoustic ports communicating with the exterior of the mobile terminal, a speaker for producing sound disposed within the housing in a position to direct the sound through the ports, and a controller distinguishing between a plurality of different operating modes of the mobile terminal, the system comprising:
- a switch disposed in the housing for movement between a first position and a second position, the switch adapted in the first position to cover the first port to substantially prevent sound produced by the speaker from passing through the first port to the exterior of the mobile terminal while allowing sound to pass from the second port, and in the second position to cover the second port to substantially prevent sound produced by the speaker from passing through the second port to the exterior of the mobile terminal while allowing sound to pass from the first port;
- means for detecting a change in the operating mode of the mobile terminal; and
- means moving the switch to the appropriate position based on the current operating mode of the mobile terminal.

18. The system for controlling the source of sound emitted from a mobile terminal as recited in claim 17, further comprising means for accessing a plurality of audio settings representative of the sound level to be emitted from the speaker, each operating mode of the mobile terminal being associated with one of the audio settings for controlling the level of sound emitted from the speaker depending on the operating mode.

19. The system for controlling the source of sound emitted from a mobile terminal as recited in claim 17, further comprising an audio block in communication with the controller for adjusting the audio setting of the speaker depending on the operating mode of the mobile terminal.

20. The system for controlling the source of sound emitted from a mobile terminal as recited in claim 17, further comprising a user input operatively associated with the controller for communicating a change of operating mode to the controller.

21. A system for controlling the source of sound emitted from a mobile terminal as recited in claim 20, wherein the means for communicating the change of operating mode comprises an actuating button.

22. A system for controlling the source of sound emitted from a mobile terminal as recited in claim 20, wherein the means for communicating the change of operating mode comprises a cover moveably mounted on the housing for movement between a first position and a second position, and a sensor for sensing when the cover is in the second position.

23. A system for controlling the source of sound emitted from a mobile terminal as recited in claim 17, wherein the switch moving means is a device for transforming an electrical signal into motion of a mechanical element operatively connected to the device.

24. A system for controlling the source of sound emitted from a mobile terminal as recited in claim 17, wherein the switch moving means is a linear motor or a radial step motor.

* * * * *